US008127354B1

(12) United States Patent
Bettini et al.

(10) Patent No.: US 8,127,354 B1
(45) Date of Patent: Feb. 28, 2012

(54) SYSTEM, METHOD, AND COMPUTER PROGRAM PRODUCT FOR IDENTIFYING VULNERABILITIES ASSOCIATED WITH DATA LOADED IN MEMORY

(75) Inventors: Anthony J. Bettini, San Francisco, CA (US); Michael M. Price, San Ramon, CA (US)

(73) Assignee: McAfee, Inc., Santa Clara, CA (US)

( * ) Notice: Subject to any disclaimer, the term of this patent is extended or adjusted under 35 U.S.C. 154(b) by 660 days.

(21) Appl. No.: 12/248,550

(22) Filed: Oct. 9, 2008

(51) Int. Cl.
*G06F 11/00* (2006.01)
(52) U.S. Cl. .......................................... 726/22; 726/25
(58) Field of Classification Search .............. 726/22–26; 717/168, 169, 170
See application file for complete search history.

(56) References Cited

U.S. PATENT DOCUMENTS

| 7,716,727 | B2 * | 5/2010 | Phillips et al. ................ 726/11 |
| 7,913,303 | B1 * | 3/2011 | Rouland et al. ............... 726/23 |
| 7,945,958 | B2 * | 5/2011 | Amarasinghe et al. ......... 726/25 |
| 2005/0108562 | A1 * | 5/2005 | Khazan et al. ................ 713/200 |
| 2008/0104699 | A1 * | 5/2008 | Gounares et al. .............. 726/22 |

OTHER PUBLICATIONS

"Enterprise Security Manager," copyright 2008 Symantec Corporation, http://www.symantec.com/avcenter/security/Content/Product/Product_ESM.html.
"Personal Software Inspector (PSI)," copyright Secunia 2002-2008, http://secunia.com/vulnerability_scanning/personal/.
"Founstonc—A division of McAfee," copyright 2003-2008, McAfee, Inc., http://www.foundstone.com/us/index.asp.

* cited by examiner

*Primary Examiner* — Krisna Lim
(74) *Attorney, Agent, or Firm* — Patent Capital Group

(57) ABSTRACT

A system, method, and computer program product are provided for identifying vulnerabilities associated with data loaded in memory. In operation, a subset of data that is loaded in memory is identified. Additionally, the subset of data is compared to a list of known data. Furthermore, there is a reaction based on the comparison.

16 Claims, 5 Drawing Sheets

SYSTEM, METHOD, AND COMPUTER PROGRAM PRODUCT FOR IDENTIFYING VULNERABILITIES ASSOCIATED WITH DATA LOADED IN MEMORY

FIELD OF THE INVENTION

The present invention relates to vulnerability assessment, and more particularly to identifying vulnerabilities for remediation purposes.

BACKGROUND

In computer security, the term vulnerability refers to a weakness in a computer system that allows an attacker to violate the integrity of that system. Vulnerabilities may result from software bugs, a computer virus or other malware, a script code injection, a structured query language (SQL) injection, and/or other techniques. A vulnerability may exist in theory, or may have a known instance of an exploit.

Traditional vulnerability scanning, assessment, and management software has been implemented in a network-centric fashion. Although host-based vulnerability scanning, assessment, and management software exists, these host-based implementations are typically managed implementations. Additionally, these host-based implementations typically have a patch management or policy violation focus.

Such managed implementations often require regular updating and maintenance. Furthermore, these implementations often evaluate dormant, unused applications without considering the possibility of these applications never opening an attack vector to exploit a vulnerability of the host system. There is thus a need for overcoming these and/or other issues associated with the prior art.

SUMMARY

A system, method, and computer program product are provided for identifying vulnerabilities associated with data loaded in memory. In operation, a subset of data that is loaded in memory is identified. Additionally, the subset of data is compared to a list of known data. Furthermore, there is a reaction based on the comparison.

DETAILED DESCRIPTION

Figure 1:
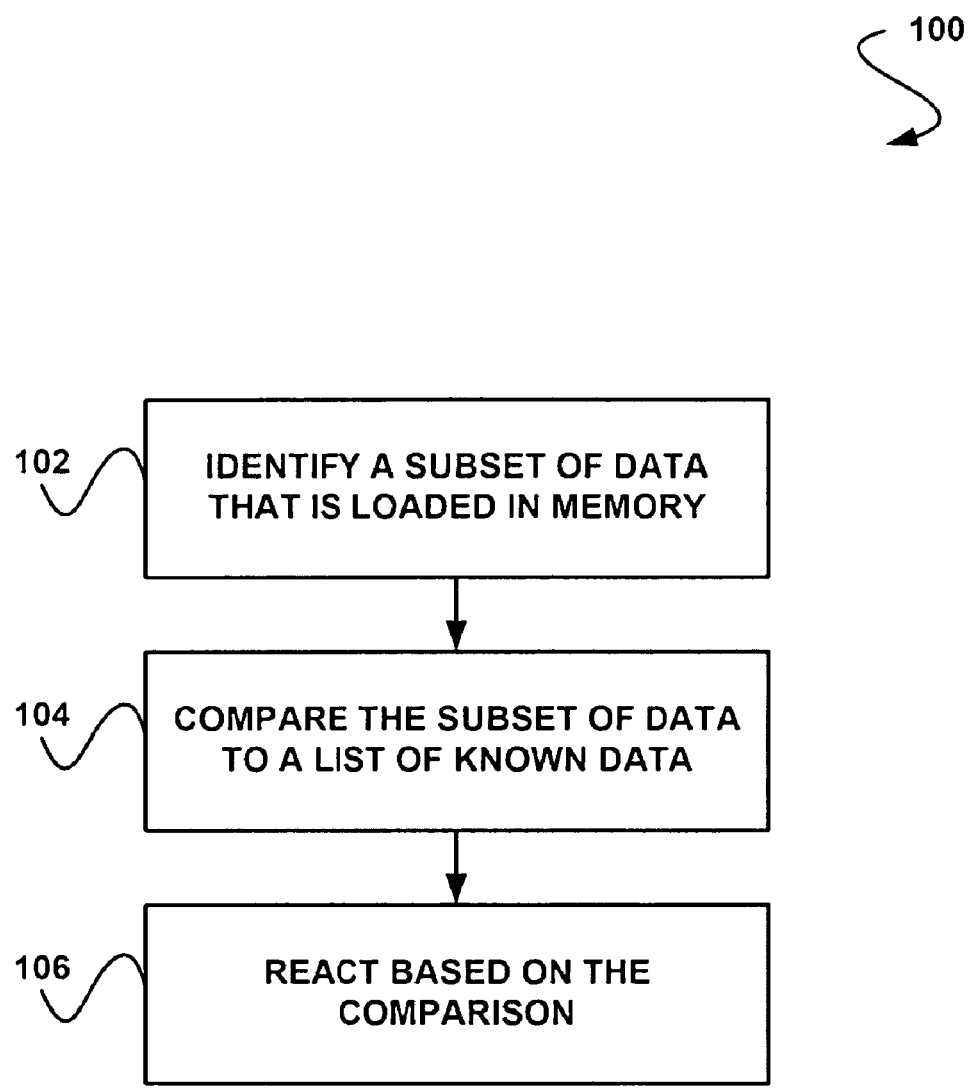
FIG. 1 shows a method for identifying vulnerabilities associated with data loaded in memory, in accordance with one embodiment.

FIG. 1 shows a method 100 for identifying vulnerabilities associated with data loaded in memory, in accordance with one embodiment. As shown, a subset of data that is loaded in memory is identified. See operation 102.

In this case, the subset of data loaded in memory may include any data loaded into memory as a result of opening or executing a software application, computer program, and/or file. For example, in various embodiments, the subset of data may include one or more libraries [e.g. dynamic-link library (DLL) files, etc.] loaded into memory as a result of opening or executing an application, one or more files loaded into memory as a result of opening or executing an application, one or more executables loaded into memory as a result of opening or executing an application, and/or any other subset of data that meets the above definition.

In these cases, the application, computer program, and/or file may include any items that load data into memory as a result of being executed or opened. For example, in various embodiments, the application may include a word processor application, a spread sheet generation application, a media player application, and/or any other application, computer program, and/or file.

Once the subset of data is identified, the subset of data is compared to a list of known data. See operation 104. In one embodiment, the list of known data may include known data that is known to be safe.

In this case, the comparison may include comparing at least one name of the subset of data with at least one name of the known data to determine if a match exists. Subsequently, if it is determined that the match exists, the comparison may further include comparing a version of the subset of data with a minimum version of the known data that is known to be safe.

In another embodiment, the known data may be data that is known to be unsafe. In this case, if it is determined that the match exists, the comparison may further include comparing a version of the subset of data with a version of the known data that is known to be unsafe. As an option, the subset of data and the list of known data may be, identified utilizing a plurality of file names and/or version identifiers.

Once the subset of data is compared to the list of known data, there is a reaction based on the comparison. See operation 106. The reaction may include any number of actions.

For example, in one embodiment, the reaction may include reporting a vulnerability. In another embodiment, the reaction may include blocking access to the subset of data. In still another embodiment, the reaction may include replacing or updating the subset of data.

As an option, the reaction may be carried out if the version of the subset of data is less than the minimum version of the known data that is known to be safe. In this case, the reaction may include replacing the subset of data with data that is of a version that is known to be safe. In this case, the reacting may also include prompting a user to initiate such replacement.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
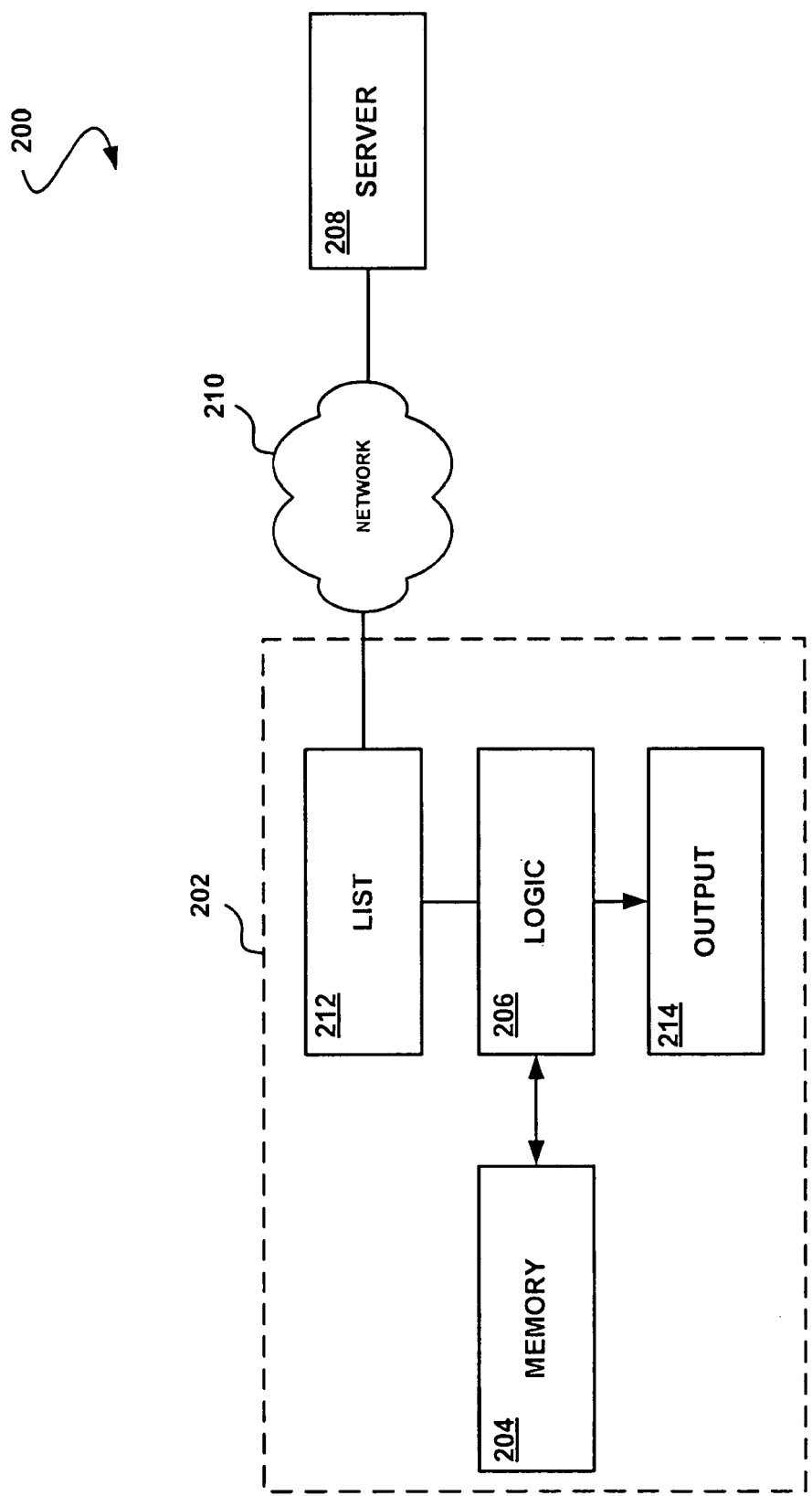
FIG. 2 shows a system for identifying vulnerabilities associated with data loaded in memory, in accordance with one embodiment.

FIG. 2 shows a system 200 for identifying vulnerabilities associated with data loaded in memory, in accordance with one embodiment. As an option, the system 200 may be implemented in the context of the environment of FIG. 1. Of course, however, the system 200 may be implemented in any desired environment. It should also be noted that the aforementioned definitions may apply during the present description.

In operation, a host device 202 loads a subset of data into memory 204 as a result of executing an associated software application. Logic 206 is then utilized to identify the subset of data in memory 204. In this case, the subset of data may be identified by identifying at least one running process associated with the application. As an option, the subset of data may be identified by identifying at least one imported library associated with the at least one running process.

Although the logic 206 is illustrated in FIG. 2 as being located on the host device 202, the logic 206 is not limited to being located on the host device 202. In various embodiments, the logic 206 may include host-based logic (i.e. located on the host device 202) or network-based logic. For example, the logic 206 may include logic provided by a server 208 over a network 210.

It should be noted that the host device 202 may include any device capable of executing an application. For example, in various embodiments, the host device 202 may include a desktop computer, lap-top computer, hand-held computer, mobile phone, personal digital assistant (PDA), peripheral (e.g. printer, etc.), any component of a computer, and/or any other type of logic. Additionally, the network 210 may include a local area network (LAN), a wireless network, a wide area network (WAN) such as the Internet, peer-to-peer network, etc.

Once the subset of data stored in the memory 204 is identified, the subset of data is compared to a list of known data 212 utilizing the logic 206. In various embodiments, the comparison may be initiated utilizing different techniques. For example, in one embodiment, the comparison may be performed in response to the subset of data being loaded in the memory 204.

In another embodiment, the comparison may be performed on-demand. In still another embodiment, the comparison may be performed in accordance with a schedule. In either case, the list of known data 212 may be a list stored on the host device 202 or on the server 208.

In one embodiment, the list of known data 212 may be provided to the host device 202 from the server 208. As an option, the list of known data 212 may be provided to the host device 202 periodically. For example, the list of known data 212 may be provided to the host device 202 at predetermined time intervals. In this case, the time intervals may be user configurable (e.g., by a user of the host device 202 or by a user at the server 208, etc.).

As another option, the list of known data 212 may be provided to the host device 202 upon an update to the list 212. For example, when data in the list of known data 212 is updated, the server 208 may send the list 212 to the host device 202. As yet another option, the list may be automatically sent to the host device 202 upon the execution of an application.

In another embodiment, the list of known data 212 may be stored on the server 208 and any processing may be implemented on the server 208. For example, the server 208 may identify the subset of data in the memory 204 of the host device 202. In this case, the subset of data may be communicated to the server 208 from the host device 202.

The server 208 may then compare the subset of data to the list of known data 212 utilizing the logic 206 located on the server 208. Regardless of whether the comparison is implemented on the server 208 or the host device 202, the result of the comparison is formulated into an output 214. This output 214 may then be utilized to determine a reaction based on the comparison.

As an example implementation of the system 200, a software patch may be released by a software provider. In this case, the patch may resolve a vulnerability that is present in one or more files (e.g. a DLL, etc.) loaded in the memory 204. Thus, the patch may provide a new or updated version of those files.

The logic 206 may include a vulnerability assessment tool, either host-based or network-based, that determines the location of the files in the memory 204 based on enumerating processes, then enumerating loaded libraries, and may determine a version number of the files loaded in the memory 204. If the files in the memory 204 have a version that is lower than the files deployed by the patch, the host device 202 may be assessed as vulnerable due to having the vulnerable code actively loaded in the memory 204.

In addition, the logic 206 may be utilized to determine the location of the files on a disk (not shown) from a registry and may determine if the version of the file on the disk is older than the patched file based on the version. If the file version of the file on the disk is lower than the file deployed by the patch, the system may also be assessed as vulnerable due to having the vulnerable code on the disk.

In this way, the logic 206 will be able to determine whether a vulnerable process is actively running as well as whether a vulnerable file is stored on a disk. Furthermore, in one embodiment, vulnerabilities may be detected in systems utilizing a side-by-side assembly implementation (e.g. Microsoft Windows Side-by-Side, etc.).

A side-by-side application compatibility framework may allow different versions of libraries to co-exist on the same system. In these cases, the different versions may contain different security vulnerabilities. Thus, the security vulnerabilities for each of the different versions may be determined and remedied utilizing data loaded in memory as a result of running these different versions.

For example, the subset of data may include a first subset of data and a second subset of data. In this case, the first subset set of data may be loaded into the memory 204 as a result of executing a first application. Additionally, the second subset of data may be loaded into the memory 204 as a result of executing a second application.

Subsequently, the first and the second subset of data may be assessed for vulnerabilities. In other words, the first subset of data and the second subset of data may both be compared to the list of known data. An appropriate reaction may then be implemented based on this comparison.

Figure 3:
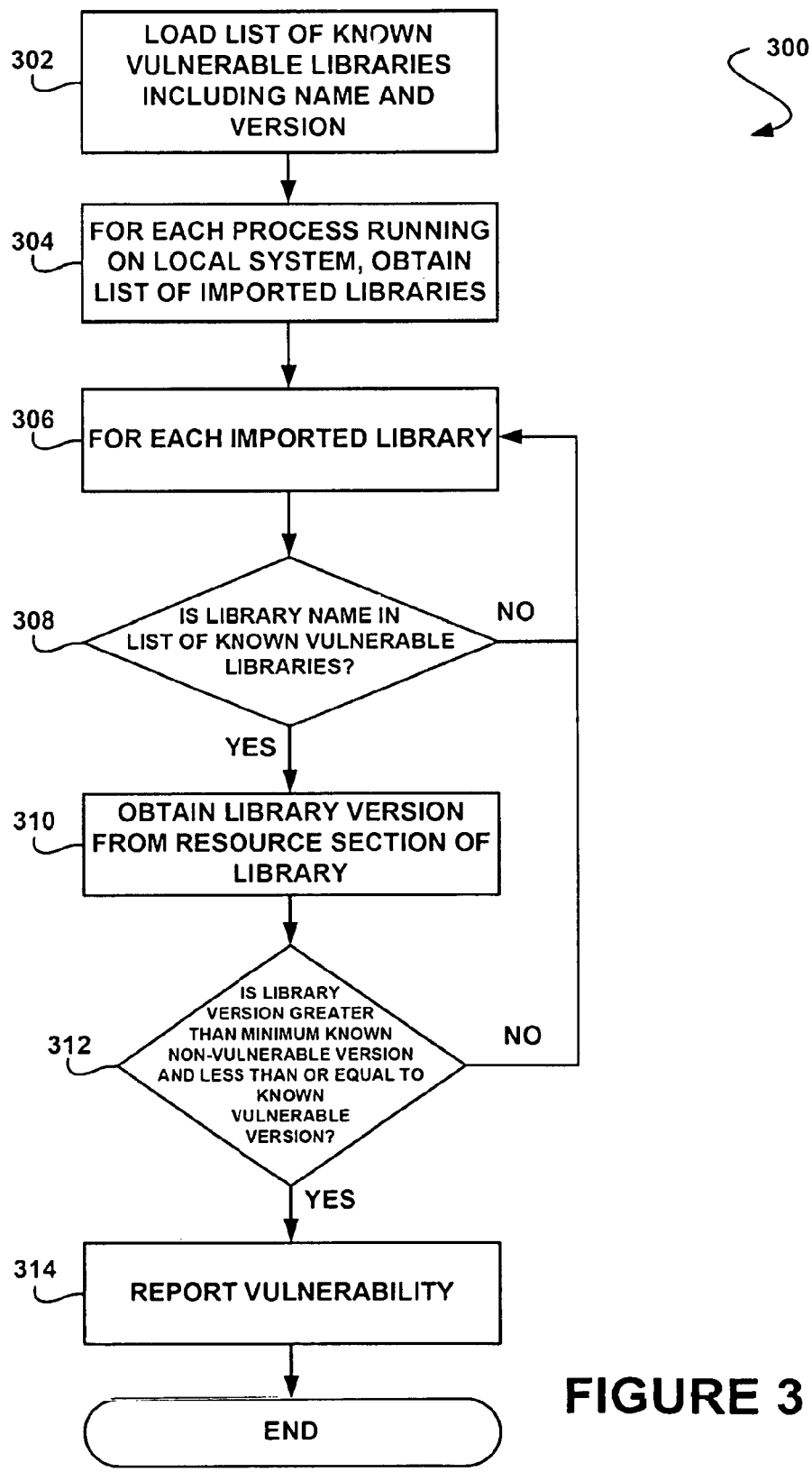
FIG. 3 shows a method for identifying vulnerabilities associated with data loaded in memory, in accordance with another embodiment.

FIG. 3 shows a method 300 for identifying vulnerabilities associated with data loaded in memory, in accordance with another embodiment. As an option, the method 300 may be implemented in the context of the architecture and environment of FIGS. 1-2. Of course, however, the method 300 may be carried out in any desired environment. Again, the aforementioned definitions may apply during the present description.

As shown, a list of known vulnerabilities is loaded. See operation 302. In this case, the list may include name information and/or version information. For example, the list may include one or more names of files, applications, and/or other data.

Furthermore, the list may include version information associated with such files, applications, and/or other data. In this case, the version information may include version numbers for outdated or vulnerable items, version numbers for updated items, a range of version numbers for vulnerable items, a range of version numbers for non-vulnerable items, and/or any other version information.

In one embodiment, the list may include names, version numbers, default locations, sizes (e.g. a 32-bit library, a 64-bit library, etc.), types, language information, hashes, and/or metadata information for all files that may be vulnerable. In this case, the list may be loaded onto a host system from a server. Furthermore, the list may be updated continuously, periodically, on demand, etc.

Once the list of known vulnerabilities is loaded to a host system, a list of imported libraries is obtained for every process running on the host system. See operation 304. In this case, the imported libraries may include any library file and/or executable that is imported into memory as a result of an associated process running on the host system.

The imported libraries may be obtained utilizing an operating system application programming interface (API) and/or other logic. For example, the imported libraries may be obtained utilizing an API for determining all processes running on the host system. For every running process, an import table may be utilized to determine the list of imported libraries.

Each of these imported libraries (e.g. each list of imported libraries, etc.) may then be compared to the list of known vulnerabilities. Thus, for each imported library, it is determined whether the library name is in the list of known vulnerable libraries. See operations 306-308.

If it is determined that a library name in the list of imported libraries is in the list of known vulnerable libraries, a library version is obtained from a resource section of that library. See operation 310. It is then determined whether the imported library version is greater than a minimum known non-vulnerable version and less than or equal to a known vulnerable version. See operation 312.

If it is determined that the imported library version is greater than a minimum known non-vulnerable version and less than or equal to a known vulnerable version, the imported library may be deemed vulnerable. In this case, the vulnerability may be reported. See operation 314.

In one embodiment, the reporting may include notifying a user of the host system. In another embodiment, the reporting may include notifying a server associated with the host system. In still another embodiment, a system administrator may be notified. The vulnerability may be logged as part of the reporting.

In addition to reporting the vulnerability, further reactions may be implemented by the host system and/or a server associated with the host system. In this case, the reaction may include prohibiting use of an application associated with the vulnerability. As another option, the vulnerable library may be updated.

It should be noted that, in various embodiments, different techniques may be utilized in operation 312 to determine whether the imported libraries are vulnerable. For example, in one embodiment, it may be determined whether the version of the imported library is different than a version of a known vulnerable version. In another embodiment, it may be determined whether the version of the imported library is an unknown version.

Furthermore, in one embodiment, the method 300 may be implemented in conjunction with a vulnerability scan of a disk (e.g. a hard drive, etc.) of the host system. For example, data (e.g. dynamic-link library files, etc.) that is stored on a disk may be identified. This data may then be compared to the list of known data.

Figure 4:
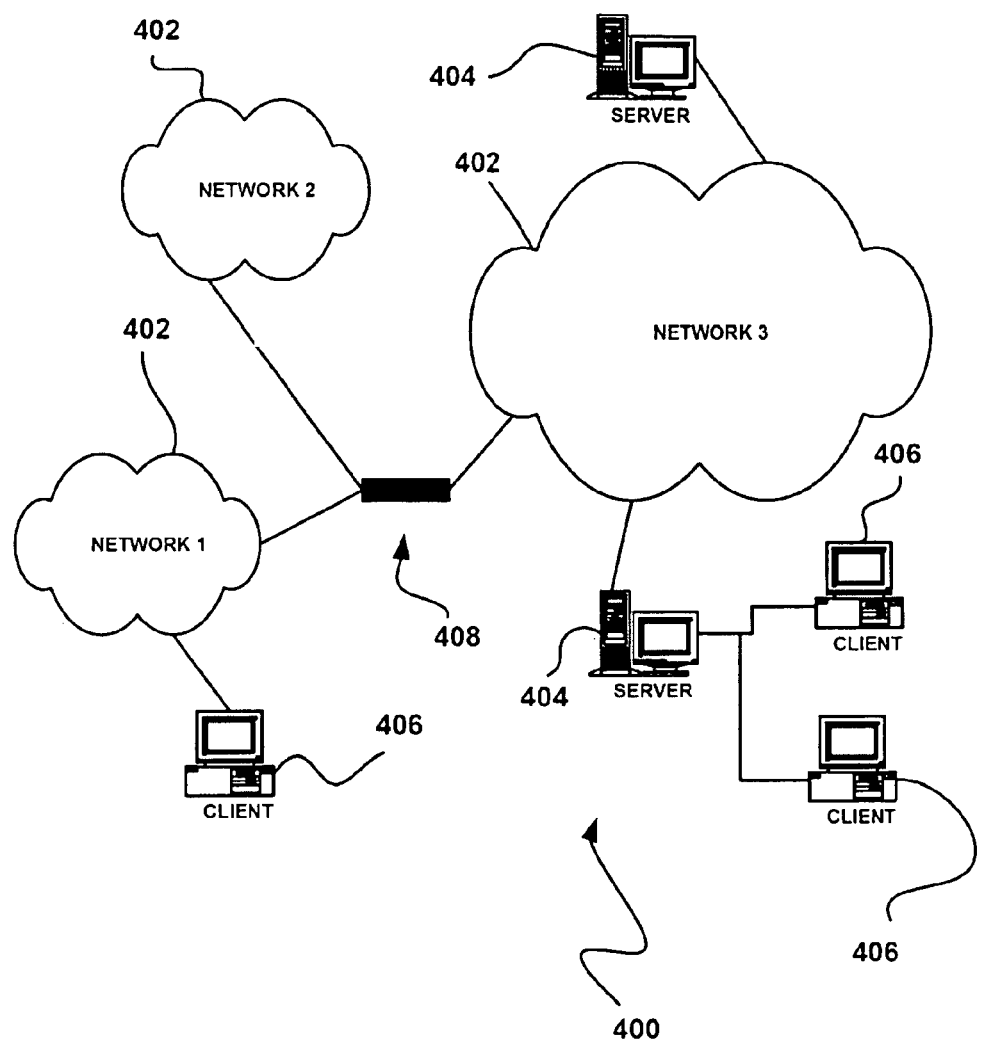
FIG. 4 illustrates a network architecture, in accordance with one embodiment.

Furthermore, there may be a reaction based on the comparison of the data stored on the disk to the list of known data. In this case, the reaction may include any appropriate action. For example, in various embodiments, the reaction may include updating the vulnerable data, prohibiting the use of the vulnerable data, and/or any other appropriate action FIG. 4 illustrates a network architecture 400 in which the various architecture and/or functionality of the various previous embodiments may be implemented. As shown, a plurality of networks 402 is provided. In the context of the present network architecture 400, the networks 402 may each take any form including, but not limited to a local area network (LAN), a wireless network, a wide area network (WAN) such as the Internet, peer-to-peer network, etc.

Coupled to the networks 402 are servers 404 which are capable of communicating over the networks 402. Also coupled to the networks 402 and the servers 404 is a plurality of clients 406. Such servers 404 and/or clients 406 may each include a desktop computer, lap-top computer, hand-held computer, mobile phone, personal digital assistant, peripheral (e.g. printer, etc.), any component of a computer, and/or any other type of logic. In order to facilitate communication among the networks 402, at least one gateway 408 is optionally coupled therebetween.

Figure 5:
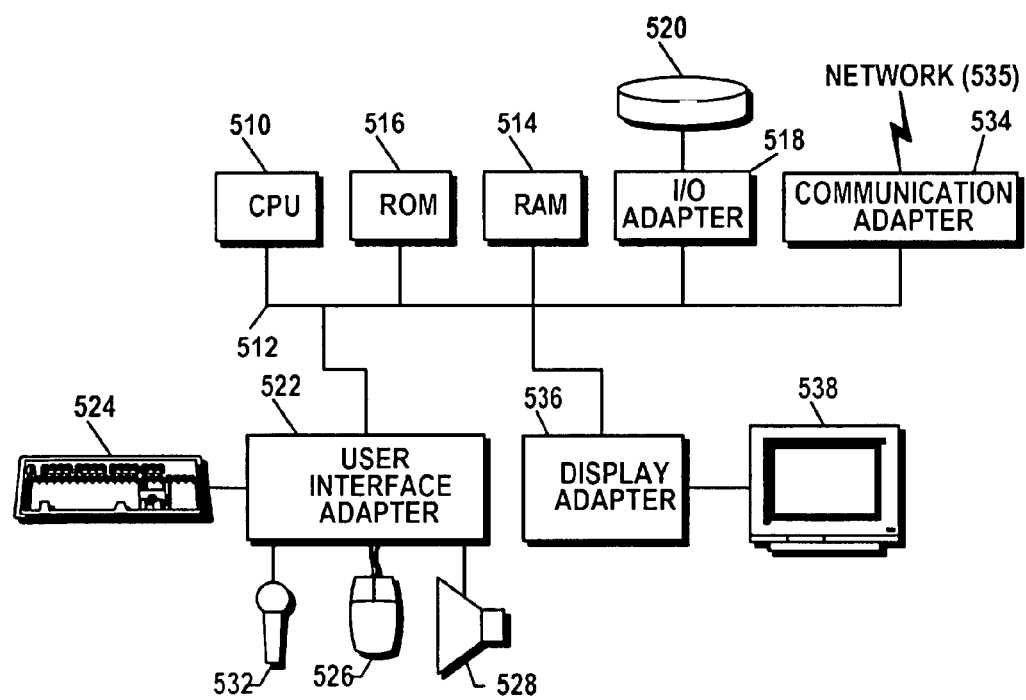
FIG. 5 shows a representative hardware environment that may be associated with the servers and/or clients of FIG. 4, in accordance with one embodiment.

FIG. 5 shows a representative hardware environment that may be associated with the servers 404 and/or clients 406 of FIG. 4, in accordance with one embodiment. Such figure illustrates a typical hardware configuration of a workstation in accordance with one embodiment having a central processing unit 510, such as a microprocessor, and a number of other units interconnected via a system bus 512.

The workstation shown in FIG. 5 includes a Random Access Memory (RAM) 514, Read Only Memory (ROM) 516, an I/O adapter 518 for connecting peripheral devices such as disk storage units 520 to the bus 512, a user interface adapter 522 for connecting a keyboard 524, a mouse 526, a speaker 528, a microphone 532, and/or other user interface devices such as a touch screen (not shown) to the bus 512, communication adapter 534 for connecting the workstation to a communication network 535 (e.g., a data processing network) and a display adapter 536 for connecting the bus 512 to a display device 538.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth above.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable storage medium for performing operations, comprising:

identifying a subset of data that is loaded in memory as a result of executing an associated software application;

comparing the subset of data to a list of known data, which includes comparing at least one name of the subset of data with at least one name of the known data to determine if a match exists, and wherein if it is determined that the match exists, the comparison further includes comparing a version of the subset of data with a minimum version of the known data known to be safe; and reacting based on the comparison.

2. The computer program product of claim 1, wherein the subset of data is loaded in memory as a result of an associated application being executed.

3. The computer program product of claim 1, wherein the comparison is performed, in response to the subset of data being loaded in memory.

4. The computer program product of claim 1, wherein the comparison is performed on-demand.

5. The computer program product of claim 1, wherein the comparison is performed in accordance with a schedule.

6. The computer program product of claim 1, wherein the subset of data and the list of known data are identified utilizing a plurality of file names and version identifiers.

7. The computer program product of claim 1, wherein the list of known data is updated on a periodic basis.

8. The computer program product of claim 1, wherein the subset of data is identified by identifying at least one running process.

9. The computer program product of claim 8, wherein the subset of data is identified by identifying at least one imported library associated with the at least one running process.

10. The computer program product of claim 1, wherein the list of known data includes known data that is known to be safe.

11. The computer program product of claim 1, wherein the reacting includes reporting a vulnerability.

12. The computer program product of claim 1, wherein the reacting includes blocking access to the subset of data.

13. The computer program product of claim 1, and further comprising computer code for identifying data that is stored on a disk, comparing the data stored on the disk to the list of known data, and reacting, based on the comparison of the data stored on the disk to the list of known data.

14. The computer program product of claim 1, wherein the subset of data includes a dynamic-link library (DLL) file.

15. The computer program product of claim 1, wherein the subset of data includes a first subset of data and a second subset of data, the first subset of data being loaded into memory as a result of executing a first application and the second subset of data being loaded into memory as a result of executing a second application.

16. A method, comprising:
identifying a subset of data that is loaded in memory as a result of executing an associated software application;
comparing the subset of data to a list of known data, which includes comparing at least one name of the subset of data with at least one name of the known data to determine if a match exists, and wherein if it is determined that the match exists, the comparison further includes comparing a version of the subset of data with a minimum version of the known data known to be safe; and
reacting based on the comparison.

* * * * *